US012399163B2

(12) United States Patent
Lamberti et al.

(10) Patent No.: US 12,399,163 B2
(45) Date of Patent: Aug. 26, 2025

(54) PASSIVE CHRONOMETRIC TAMPER-INDICATING DEVICE AND METHOD

(71) Applicant: Consolidated Nuclear Security, LLC, Oak Ridge, TN (US)

(72) Inventors: Vincent E. Lamberti, Oak Ridge, TN (US); Bruce W. Moran, Brookeville, MD (US)

(73) Assignee: Consolidated Nuclear Security, LLC, Oak Ride, TN (US)

( * ) Notice: Subject to any disclaimer, the term of this patent is extended or adjusted under 35 U.S.C. 154(b) by 1454 days.

(21) Appl. No.: 16/525,644

(22) Filed: Jul. 30, 2019

(65) Prior Publication Data

US 2021/0033580 A1 Feb. 4, 2021

(51) Int. Cl.
*G01N 31/22* (2006.01)
*B65D 43/02* (2006.01)
(Continued)

(52) U.S. Cl.
CPC ......... *G01N 31/224* (2013.01); *G09F 3/0292* (2013.01); *B65D 43/0235* (2013.01);
(Continued)

(58) Field of Classification Search
CPC .... G01N 31/224; G01N 31/22; G09F 3/0292; G09F 3/0291; B65D 43/0235; B65D 2401/00; G01K 11/12; Y10S 428/916
See application file for complete search history.

(56) References Cited

U.S. PATENT DOCUMENTS 3,539,794 A * 11/1970 Kennerly ................. F21K 2/06
252/700
4,408,557 A * 10/1983 Bradley ................... G01K 3/04
368/327
(Continued)

FOREIGN PATENT DOCUMENTS

WO WO-02095671 A1 * 11/2002 ........... B65D 51/245
WO WO-2011080375 A1 * 7/2011 ........... B65D 55/026
(Continued)

OTHER PUBLICATIONS

CN-105324446-A; Gazaway et al., "Thermosensitive Tamper Indication Mark", 2016. (Year: 2016).*
(Continued)

*Primary Examiner* — Kristina M Deherrera
*Assistant Examiner* — Tania Courson
(74) *Attorney, Agent, or Firm* — Clements Bernard Walker; Christopher L. Bernard

(57) ABSTRACT

A tamper-indicating device, the tamper-indicating device including: an elongate structure; a penetrant chamber coupled to the elongate structure; and a physical barrier (or other release mechanism) disposed between the elongate structure and the penetrant chamber; wherein the penetrant chamber is adapted to contain a penetrant material that selectively diffuses into the elongate structure at a predetermined rate when the physical barrier is ruptured (or the other release mechanism is actuated) by a tamper or environmental event; and wherein the penetrant material creates an overt or covert indication of the degree of diffusion into the elongate structure, the degree of diffusion indicating an amount of time since the tamper or environmental event. The tamper-indicating device further includes a substrate coupled to the elongate structure. Optionally, the tamper-indicating device further includes a visible time scale dis-
(Continued)

US 12,399,163 B2

Page 2 posed on the substrate substantially adjacent to the elongate structure.

6 Claims, 3 Drawing Sheets

(51) Int. Cl.
  *G01K 11/12* (2021.01)
  *G09F 3/00* (2006.01)
(52) U.S. Cl.
  CPC .......... *B65D 2401/00* (2020.05); *G01K 11/12* (2013.01); *G01N 31/22* (2013.01); *G09F 3/0291* (2013.01); *Y10S 428/916* (2013.01)

(56) References Cited

U.S. PATENT DOCUMENTS

| | | | | |
|---|---|---|---|---|
| 4,643,122 | A | | 2/1987 | Seybold |
| 5,043,851 | A | * | 8/1991 | Kaplan ............... F21K 2/06 |
| | | | | 362/396 |
| 5,404,834 | A | * | 4/1995 | Murphy ............... G01K 11/06 |
| | | | | 374/E11.006 |
| 5,446,629 | A | * | 8/1995 | Steiger .................. F21K 2/06 |
| | | | | 362/374 |
| 5,488,544 | A | * | 1/1996 | Ladyjensky ............ F21K 2/06 |
| | | | | 206/219 |
| 5,785,354 | A | | 7/1998 | Haas |
| 5,822,280 | A | | 10/1998 | Haas |
| 5,930,206 | A | | 7/1999 | Haas et al. |
| 5,931,383 | A | * | 8/1999 | Palmer ............... A47G 21/182 |
| | | | | 239/33 |
| 5,971,282 | A | * | 10/1999 | Rollender .......... G06K 19/0723 |
| | | | | 235/487 |
| 5,980,055 | A | * | 11/1999 | Palmer ................. F21K 2/06 |
| | | | | 206/219 |
| 6,758,572 | B2 | * | 7/2004 | Ladyjensky ............ F21K 2/06 |
| | | | | 362/812 |
| 7,388,814 | B2 | | 6/2008 | Teffenhart et al. |
| 7,422,781 | B2 | * | 9/2008 | Gosselin ............... G09F 3/0292 |
| | | | | 428/354 |
| 7,487,728 | B2 | * | 2/2009 | Cranor ................. F42B 12/50 |
| | | | | 102/513 |
| 7,722,203 | B2 | * | 5/2010 | Longo .................. F21K 2/06 |
| | | | | 362/374 |
| 7,777,208 | B2 | * | 8/2010 | Cranor ................. C09K 11/07 |
| | | | | 252/700 |
| 7,808,861 | B2 | * | 10/2010 | Wien .................... G04F 13/06 |
| | | | | 368/327 |
| 8,104,949 | B2 | | 1/2012 | Robinson et al. |
| 8,343,437 | B2 | * | 1/2013 | Patel .................... G01D 3/10 |
| | | | | 436/2 |
| 9,546,912 | B2 | * | 1/2017 | Chan .................... G01K 3/04 |
| 9,752,902 | B2 | | 9/2017 | Heacock et al. |
| 10,704,172 | B2 | * | 7/2020 | Chandrasekaran ....... B32B 7/12 |
| 11,398,167 | B2 | * | 7/2022 | Robinson ............ G09F 3/0291 |
| 11,828,660 | B2 | * | 11/2023 | Patel .................... G01K 11/12 |
| 2003/0173408 | A1 | * | 9/2003 | Mosher, Jr. ........... A61B 90/90 |
| | | | | 235/492 |
| 2007/0056871 | A1 | * | 3/2007 | Griffiths ................ A61J 1/14 |
| | | | | 206/459.1 |
| 2009/0301382 | A1 | * | 12/2009 | Patel .................... G01D 3/10 |
| | | | | 116/201 |
| 2010/0043694 | A1 | * | 2/2010 | Patel ................... G09F 3/0341 |
| | | | | 156/60 |
| 2010/0263244 | A1 | | 10/2010 | Tabirian et al. |
| 2010/0288182 | A1 | * | 11/2010 | Klots .................. B42D 25/378 |
| | | | | 116/207 |
| 2012/0236900 | A1 | * | 9/2012 | Hubbard ............... G01K 3/04 |
| | | | | 374/102 |
| 2012/0244623 | A1 | * | 9/2012 | Patel ................... G09F 3/0292 |
| | | | | 374/102 |
| 2016/0161919 | A1 | * | 6/2016 | Patel ..................... G07C 1/02 |
| | | | | 73/1.42 |
| 2016/0349224 | A1 | | 12/2016 | Patel et al. |

FOREIGN PATENT DOCUMENTS

| | | | | |
|---|---|---|---|---|
| WO | 2015200212 A1 | | 12/2015 | |
| WO | WO-2017001188 A1 | * | 1/2017 | ............. B32B 27/10 |
| WO | WO-2017086883 A1 | * | 5/2017 | ............... G01K 3/04 |
| WO | WO-2021122574 A1 | * | 6/2021 | ............. B41M 3/14 |

OTHER PUBLICATIONS

Nurhan A. Becidyan, The Chemistry & Physics of Special Effect Pigment & Colorants "What They Are & How They Are Used", Presented during the ISCC Webinar Series, pp. 1-16, Sep. 22, 2016.
Duda J.L., Molecular diffusion in polymeric systems, Chemical Engineering Department, The Pennsylvania State University, University Park, PA 16802, U.S.A., Pure & App!. Chem., vol. 57, No. 1 1 , pp. 1681-1690, 1985.
Chowdhury M.A.,Photochromic and Thermochromic Colorants in Textile Applications, Department of Textile Technology, IIT Delhi, Hauz Khas New Delhi, India,Journal of Engineered Fibers and Fabrics 107 http://www.ieffjournal.org, vol. 9, Issue 1—2014.
Johnston R.G., Garcia A.R.E;Physical Security and Tamper-Indicating Devices, pp. 1-6.
Fraser P. Price and Paul T. Gilmore,Polymer/Polymer Diffusion. I. Experimental Technique,Journal of Polymer Science: Polymer Symposium 63.33-44 ( I 978)0 1978 John Wiley & Sons, Inc., pp. 1-12.
Johnston R.G,Tamper-Indicating Seals: Practices, Problems, and Standards, For the World Customs Organization Security Meeting, Feb. 11-14, 2003, Brussels, Belgium, pp. 1-18.
CHEM-UA 652: Thermodynamics and Kinetics, pp. 1-7.
Johnston R.G,Tamper-Indicating Seals for Nuclear Disarmament and Hazardous Waste Management,Science & Global Security, vol. 9 pp. 93-112 © 2001 Taylor and Francis.
Peski, Edward T. and Hall, Howard L. (2015) "Impurity Diffusion as a Possible Metal Chronometer for Pre-Detonation Nuclear Forensics," International Journal of Nuclear Security: vol. 1: No. 1, Article 12.
Frisch, H.L; Sorption and Transport in Glassy Polymers—A Review;Department of Chemistry State University of New York at Albany Albany, New York 12222;Polymer Engineering and Science, Mid-Jan. 1980, vol. 20, No. 1.
Ajeeb, F., Younes, B.,Khsara, A.K;Investigating the Relationship between Thermochromic Pigment Based knitted Fabrics Properties and Human Body Temperature;IOSR Journal of Polymer and Textile Engineering (IOSR-JPTE) e-ISSN: 2348-019X, p-ISSN: 2348-0181, vol. 4, Issue 3 (May-Jun. 2017), pp. 44-52 www.iosrjournals.org.
Cavtleer D.R; The United States Department of Defense;User's Guide; Antipilferage seal user's guide; Jun. 19, 1998, pp. 1-74.

* cited by examiner

PASSIVE CHRONOMETRIC TAMPER-INDICATING DEVICE AND METHOD

STATEMENT REGARDING GOVERNMENT RIGHTS

The U.S. Government has certain rights to the present disclosure pursuant to Contract No. DE-NA0001942 between the U.S. Department of Energy and Consolidated Nuclear Security, LLC.

TECHNICAL FIELD

The present disclosure relates generally to a passive chronometric tamper-indicating device (TID) and method. The TID of the present disclosure finds applicability in the nuclear, chemical, and biological nonproliferation, nuclear compliance verification, treaty verification, arms control, customs and smuggling detection, sensitive material and document protection, pharmaceutical, and consumer goods fields.

BACKGROUND

A TID, sometimes called a seal, provides unambiguous and un-erasable evidence of attempted or successful access to an object that is being monitored. Ideally, an effective TID should have an extremely high likelihood of detecting a breach of a surface to which it is attached and be unique enough that a replacement cannot be installed in its place after the breaching action has occurred. Generally, a TID needs only to maintain a permanent record of entry, and not necessarily resist it. A lock is designed to delay or complicate access. TIDs are classified as being passive or active. Passive TIDs require a physical inspection for interpretation, are not reusable, and typically take the form of frangible labels or devices based on crimped wires or cables, bolts, pull-tight plastic ties, metal or plastic straps, or padlocks, for example. Active TIDs continuously report on the state of a seal, require an on-board or external power supply, are usually reusable, and are often based on the continuity of a fiber optic bundle, for example.

Current passive TIDs do not provide a timestamp of tampering. Thus, if a seal is discovered to be breached, an unauthorized access could have occurred at any point between application and inspection. Thus, the TID of the present disclosure incorporates one or more chemical timers to indicate the time since application or disturbance. The chemical timers rely on the diffusion of penetrants, or small molecules, along lengths of fibers, such as polymer or gel fibers, and, depending upon whether the penetrant has a color in its ground state or must be stimulated to exhibit one, could be configured for overt or covert reporting.

There are many examples of color-changing time indicators. For instance, there are timing labels including thin films of photonic bandgap materials that gradually change color upon exposure to ultraviolet light. A self-expiring security badge based on the migration of ink through several layers of paper-like materials also exists. Further, a time-temperature monitor relying on lateral diffusion of a vapor through a nonporous stationary phase, such as a thin polymeric barrier, is also known. One application of this technology would be to visually indicate expired perishable products. A timer based on a color change resulting from mixing of two liquids is further known. Others have disclosed an expendable ophthalmic device, in which a dye indicates that the device should be disposed by changing color after reacting with ambient oxygen for a predetermined period of time. Closer to the present disclosure, a TID containing a response material that changes color upon exposure to certain gases has been disclosed, as has a diffusion-controlled security tag based on a solution of a compound that changes color upon evaporation of the solvent.

SUMMARY

In various exemplary embodiments, the present disclosure provides a passive TID that a uses a chemical chronometer to indicate the length of time since application or since attempted or successful intrusion. The chemical timer is based on the diffusion of a penetrant, or small molecules, along a fiber, such as a polymer or gel fiber. If the mass transport properties are well known, the diffusion length or degree provides enough information to calculate the diffusion time. The TID is designed so that the penetrant and the fiber are separated until the device is purposely or inadvertently triggered, preferably by a barrier that fails under torsion, heat, contact with a liquid, etc. This activation mechanism is similar to that used in diphenyl oxalate glow sticks. If the penetrant has a color in its ground state, the timer is overt; if the penetrant is colorless until excited, the timer is covert. Examples of the first type of penetrant are small-molecule organic dyes, such as those from the triphenylmethane, azo, anthraquinone, perylene, and indigoid categories, among others; and examples of the second type of penetrant are chromic colorants, which change color in response to various external stimuli (e.g., light, heat, electricity, pressure, contact with liquids, and electrons for photochromic, thermochromic, electrochromic, piezochromic, solvatechromic, and carsolchromic materials, respectively.

In one exemplary embodiment, the present disclosure provides a tamper-indicating device, the tamper-indicating device including: an elongate structure; a penetrant chamber coupled to the elongate structure; and a release mechanism separating the elongate structure from the penetrant chamber; wherein the penetrant chamber is adapted to contain a penetrant material that selectively diffuses into the elongate structure at a predetermined rate when the release mechanism is actuated by a tamper or environmental event; and wherein the penetrant material creates an overt or covert indication of the degree of diffusion into the elongate structure, the degree of diffusion indicating an amount of time since the tamper or environmental event. The tamper-indicating device further includes a substrate coupled to the elongate structure. Optionally, the tamper-indicating device further includes a visible time scale disposed on the substrate substantially adjacent to the elongate structure. The elongate structure includes a polymer. Optionally, the polymer is doped with a chemical that reacts with the penetrant material to create the overt or covert indication of the degree of diffusion into the elongate structure. The release mechanism includes one of: (1) a physical barrier disposed between the elongate structure and the penetrant chamber that is adapted to be ruptured by the tamper or environmental event and (2) a heater/radiation device that is adapted to be actuated by the tamper or environmental event and melt, thin, or evaporate the penetrant material. Optionally, the tamper-indicating device further includes: an additional elongate structure disposed substantially adjacent to the elongate structure; an additional penetrant chamber coupled to the additional elongate structure; and an additional release mechanism or the release mechanism separating the elongate structure from the penetrant chamber; wherein the additional penetrant chamber is adapted to contain an additional penetrant material that selectively diffuses into the additional elongate structure at a predetermined rate when the additional release mechanism or the release mechanism is actuated by the tamper or environmental event; and wherein the additional penetrant material creates an additional overt or covert indication of the degree of diffusion into the additional elongate structure, the degree of diffusion also indicating an amount of time since the tamper or environmental event. The time scale of this second elongate structure can be complementary to the time scale of the first elongate structure, providing a more refined time-since-tamper time measurement, analogous to the hour and minute hands on a clock. Optionally, the tamper-indicating device further includes one or more chemical sensors disposed substantially adjacent to the elongate structure and adapted to indicate the presence or absence of an environmental contaminant or a tampering agent.

In another exemplary embodiment, the present disclosure provides an object to be monitored including a tamper-indicating device, the object including: one or more of a first component and a second component; an elongate structure coupled to one or more of the first component and the second component; a penetrant chamber coupled to the elongate structure; and a physical barrier disposed between the elongate structure and the penetrant chamber; wherein the penetrant chamber is adapted to contain a penetrant material that selectively diffuses into the elongate structure at a predetermined rate when the physical barrier is ruptured by a tamper or environmental event; and wherein the penetrant material creates an overt or covert indication of the degree of diffusion into the elongate structure, the degree of diffusion indicating an amount of time since the tamper or environmental event. The tamper-indicating device further includes a substrate coupled to the elongate structure, wherein the substrate is coupled to one or more of the first component and the second component. Optionally, the tamper-indicating device further includes a visible time scale disposed on the substrate substantially adjacent to the elongate structure. The elongate structure includes a polymer. Optionally, the polymer is doped with a chemical that reacts with the penetrant material to create the overt or covert indication of the degree of diffusion into the elongate structure. Optionally, the tamper-indicating device further includes: an additional elongate structure disposed substantially adjacent to the elongate structure and coupled to one or more of the first component and the second component; an additional penetrant chamber coupled to the additional elongate structure; and an additional physical barrier disposed between the additional elongate structure and the additional penetrant chamber; wherein the additional penetrant chamber is adapted to contain an additional penetrant material that selectively diffuses into the additional elongate structure at a predetermined rate when the additional physical barrier is ruptured by the tamper or environmental event; and wherein the additional penetrant material creates an additional overt or covert indication of the degree of diffusion into the additional elongate structure, the degree of diffusion also indicating an amount of time since the tamper or environmental event. The time scale of this second elongate structure can be complementary to the time scale of the first elongate structure, providing a more refined time-since-tamper time measurement, analogous to the hour and minute hands on a clock. Optionally, the tamper-indicating device further includes one or more chemical sensors disposed substantially adjacent to the elongate structure and adapted to indicate the presence or absence of an environmental contaminant or a tampering agent.

In a further exemplary embodiment, the present disclosure provides a method for monitoring an object using a tamper-indicating device, the method including: providing one or more of a first component and a second component; and coupling the tamper-indicating device to one or more of the first component and the second component, wherein the tamper-indicating device includes: an elongate structure; a penetrant chamber coupled to the elongate structure; and a release mechanism separating the elongate structure from the penetrant chamber; wherein the penetrant chamber is adapted to contain a penetrant material that selectively diffuses into the elongate structure at a predetermined rate when the release mechanism is actuated by a tamper or environmental event; and wherein the penetrant material creates an overt or covert indication of the degree of diffusion into the elongate structure, the degree of diffusion indicating an amount of time since the tamper or environmental event. The tamper-indicating device further includes a substrate coupled to the elongate structure, wherein the substrate is coupled to one or more of the first component and the second component. Optionally, the tamper-indicating device further includes a visible time scale disposed on the substrate substantially adjacent to the elongate structure. The elongate structure includes a polymer. Optionally, the polymer is doped with a chemical that reacts with the penetrant material to create the overt or covert indication of the degree of diffusion into the elongate structure. The release mechanism includes one of: (1) a physical barrier disposed between the elongate structure and the penetrant chamber that is adapted to be ruptured by the tamper or environmental event and (2) a heater/radiation device that is adapted to be actuated by the tamper or environmental event and melt, thin, or evaporate the penetrant material. Optionally, the tamper-indicating device further includes: an additional elongate structure disposed substantially adjacent to the elongate structure and coupled to one or more of the first component and the second component; an additional penetrant chamber coupled to the additional elongate structure; and an additional release mechanism or the release mechanism separating the elongate structure from the penetrant chamber; wherein the additional penetrant chamber is adapted to contain an additional penetrant material that selectively diffuses into the additional elongate structure at a predetermined rate when the additional release mechanism or the release mechanism is actuated by the tamper or environmental event; and wherein the additional penetrant material creates an additional overt or covert indication of the degree of diffusion into the additional elongate structure, the degree of diffusion also indicating an amount of time since the tamper or environmental event. The time scale of this second elongate structure can be complementary to the time scale of the first elongate structure, providing a more refined time-since-tamper time measurement, analogous to the hour and minute hands on a clock. Optionally, the tamper-indicating device further includes one or more chemical sensors disposed substantially adjacent to the elongate structure and adapted to indicate the presence or absence of an environmental contaminant or a tampering agent.

BRIEF DESCRIPTION OF THE DRAWINGS

The present disclosure is illustrated and described herein with reference to the various drawings, in which like reference numbers are used to denote device components/method steps, as appropriate, and in which.

DESCRIPTION OF EMBODIMENTS

Figure 1:
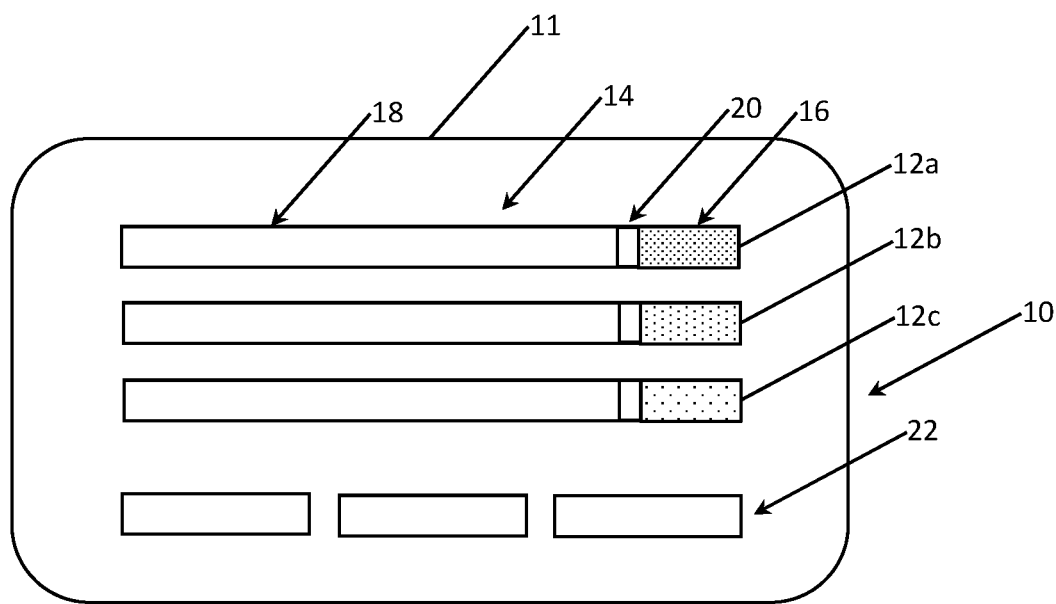
FIG. 1 is a schematic diagram illustrating one exemplary embodiment of the TID of the present disclosure utilizing a plurality of physical barriers, multiple time scales, and chemical sensors for spot tests in both pre-tamper and post-tamper actuation states.
Figure 1:
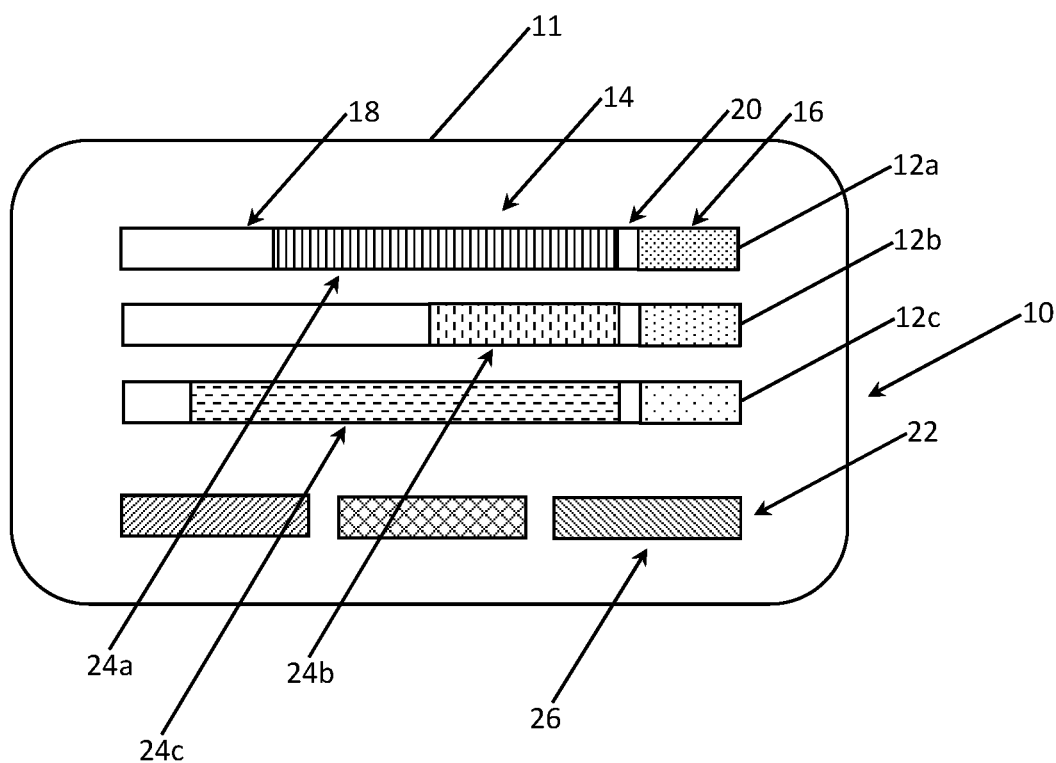

Again, in various exemplary embodiments, the present disclosure provides a passive TID that a uses a chemical chronometer to indicate the length of time since application or since attempted or successful intrusion. The chemical timer is based on the diffusion of a penetrant, or small molecules, along a fiber, such as a polymer or gel fiber. If the mass transport properties are well known, the diffusion length or degree provides enough information to calculate the diffusion time. The TID is designed so that the penetrant and the fiber are separated until the device is purposely or inadvertently triggered, preferably by a barrier that fails under torsion, heat, contact with a liquid, etc. This activation mechanism is similar to that used in diphenyl oxalate glow sticks. If the penetrant has a color in its ground state, the timer is overt; if the penetrant is colorless until excited, the timer is covert. Examples of the first type of penetrant are small-molecule organic dyes, such as those from the triphenylmethane, azo, anthraquinone, perylene, and indigoid categories, among others; and examples of the second type of penetrant are chromic colorants, which change color in response to various external stimuli (e.g., light, heat, electricity, pressure, contact with liquids, and electrons for photochromic, thermochromic, electrochromic, piezochromic, solvatechromic, and carsolchromic materials, respectively. It should be stressed that the present disclosure utilizes diffusion-defined as the movement of a penetrant from an area of higher concentration to an area of lower concentration as a result of the kinetic properties of particles of matter—as opposed to wicking-defined as the drawing of a fluid into a material by capillary action. This distinction is significant and well known to those of ordinary skill in the art.

FIG. 1 illustrates one exemplary embodiment of the TID 10 of the present disclosure. The TID 10 includes a substrate 11 on which the one or more tamper-indicating chronometers (TICs) 12a, 12b, 12c are disposed, each including a polymer or other elongate structure, fiber, or conduit 14 through which the penetrant will selectively diffuse. Here, elongate does not necessarily imply linearity, as spiral configurations and the like may also be used, for example. The penetrant chambers 16 are each separated from the diffusion portion 18 of the corresponding fiber 14 by a physical barrier 20 (i.e., a release mechanism), such as a wall, bladder, film, or the like, that is breached by torsion, heat, liquid contact, or the like associated with a tamper or attempted tamper. Alternatively, the penetrant chambers 16 can be disposed remotely from the associated fibers 14, but coupled to them via appropriate conduits, with the physical barriers 20 disposed somewhere therebetween. As alluded to above, each of the TICs 12a, 12b, 12c may include a printed or otherwise available time scale, and these time scales may vary for each TIC 12a, 12b, 12c. For example, one TIC 12a may include a relatively slow diffusion path 24a that indicates weeks, months, or years since a tamper event, while another TIC 12b may include a relatively faster diffusion path 24b that indicates hours or days since the tamper event, while another TIC 12c may include a relatively faster diffusion path 24c that indicates minutes since the tamper event. In this manner, the exact time of the tamper event may be pinpointed. Again, the TICs 12a, 12b, 12c may utilize a visible degree of penetrant diffusion based on color or the like, or they may use a dye or the like that is only visible under an activating energy, allowing for both overt and covert devices. Again, examples of the first type of penetrant are small-molecule organic dyes, such as those from the triphenylmethane, azo, anthraquinone, perylene, and indigoid categories, among others; and examples of the second type of penetrant are chromic colorants, which change color in response to various external stimuli (e.g., light, heat, electricity, pressure, contact with liquids, and electrons for photochromic, thermochromic, electrochromic, piezochromic, solvatechromic, and carsolchromic materials, respectively). The polymer may initially be clear or of a first color or state and of a different color or state after diffusion of the penetrant. The polymer may also be doped with a chemical that selectively reacts with the penetrant to achieve the desired effect and functionality.

The polymer is preferably chosen with a glass transition temperature, $T_g$, that is much less than the anticipated operating temperature, so that the fiber exists in a "rubbery" state. Below $T_g$, a polymer becomes hard and brittle, like glass. In a rubbery polymer, the rate of penetrant diffusion is much less than that of structural relaxation, so that the system rapidly returns to equilibrium. For such a rubbery polymer system, the diffusion is well-described by Fick's empirical laws of mass transport. Under steady-state conditions, along a single dimension (x), the rate of diffusion (or flux) across a unit cross-sectional area per unit time is given by Fick's first law:

$$J = -D\frac{dC(x)}{dx}, \quad (1)$$

where D is a diffusion coefficient and C(x) is the local concentration of penetrant at position x. This equation applies when the flux does not change with time and expresses the observation that the flux is proportional to the concentration gradient of the penetrant. Under transient conditions, the concentration is a function of both position and time, and its evolution is described by Fick's (nonlinear) second law:

$$\frac{\partial C(x,t)}{\partial t} = \frac{\partial}{\partial x}\left(D\frac{\partial C(x,t)}{\partial x}\right). \quad (2)$$

The diffusion coefficient may be a constant or a function of penetrant concentration, and is usually determined through experiment. Fick's laws are valid when there are no convective flows, temperature gradients, or external forces from, for example, electrical or gravitational fields. In glassy polymers, the rate of penetrant diffusion is comparable to or faster than in structural relaxation, and the diffusion mechanisms are much more complex than in rubbery polymers.

The TID 10 can be produced, or possibly additively manufactured, on a variety of substrates 11, including self-adhesive papers and plastic films, for example. The TID 10 can be built in bent or conformal shapes to fit on drawers, containers, etc., wherever and on whatever tamper monitoring is desired. Again, different penetrant-polymer couples, with different time scales, can be used on the same device, like the hour and minute hands on a clock. Further, one or more exposure-based chemical sensors 22 can be provided on the substrate 11 for detecting the presence of a chemical or environment of interest on a spot test basis, again providing an overt or covert indication 24.

It should be noted that the fibers 14, penetrant chambers 16, diffusion portions 18 and physical barriers 20 utilized herein may all be integrally formed with the substrate 11 that forms the closure, tie, tag, label, sticker or the like used as a tamper monitor in the given application. Preferably, forces or conditions associated with a tamper event act on or invade the substrate 11 such that the physical barrier 20 is ruptured or compromised, allowing the penetrant to diffuse into the fiber or other structure 14, with the degree of overt or covert diffusion over time creating the chronometric effect.

Figure 2:
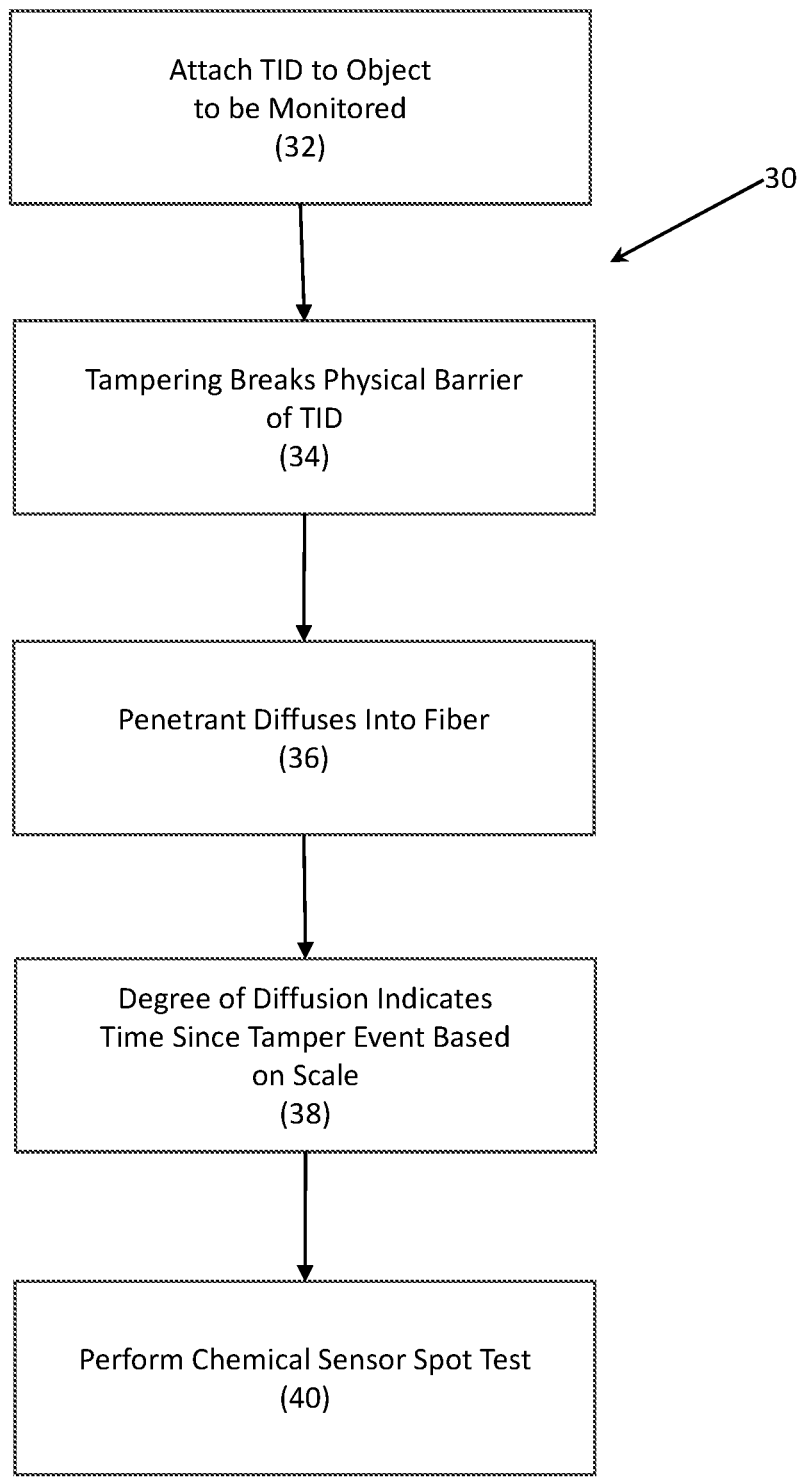
FIG. 2 is a flowchart illustrating one exemplary embodiment of a method for affixing and utilizing the TID of the present disclosure.

FIG. 2 is a flowchart illustrating one exemplary embodiment of a method 30 for affixing and utilizing the TID 10 (FIG. 1) of the present disclosure. First, the TID 10 is attached to the object to be monitored 32, such as in the form of a seal for a storage locker, container, drawer, equipment housing, or the like. Again, the TID 10 may be used in the nuclear, chemical, and biological nonproliferation, nuclear compliance verification, treaty verification, arms control, customs and smuggling detection, sensitive material and document protection, pharmaceutical, and consumer goods fields, by way of example only. Subsequently, a tamper event, temperature intrusion, liquid intrusion, or the like breaks the physical barrier 20 (FIG. 1) 34. This allows the penetrant to diffuse into the fiber 14 over time 36, creating an overt or covert gradient color signature or the like. The degree of diffusion indicates the amount of time that has passed since the tamper event 38 and may be pinpointed using the short-duration, middle-duration, and/or long-duration scales, as described above. Finally, one or more chemical sensors 22 may be used to indicate the presence or absence of an environmental contaminant of interest 40, again providing an overt or covert indication. Exemplary chemical spot tests include, but are not limited to, those designed to detect the application of materials or substances intended to dissolve the TID 10 or its adhesive, such as water, organic solvents, acids, etc.

Again, there are many examples of color-changing time indicators. For instance, there are timing labels including thin films of photonic bandgap materials that gradually change color upon exposure to ultraviolet light. A self-expiring security badge based on the migration of ink through several layers of paper-like materials also exists. Further, a time-temperature monitor relying on lateral diffusion of a vapor through a nonporous stationary phase, such as a thin polymeric barrier, is also known. One application of this technology would be to visually indicate expired perishable products. A timer based on a color change resulting from mixing of two liquids is further known. Others have disclosed an expendable ophthalmic device, in which a dye indicates that the device should be disposed by changing color after reacting with ambient oxygen for a predetermined period of time. Closer to the present disclosure, a TID containing a response material that changes color upon exposure to certain gases has been disclosed, as has a diffusion-controlled security tag based on a solution of a compound that changes color upon evaporation of the solvent.

Figure 3:
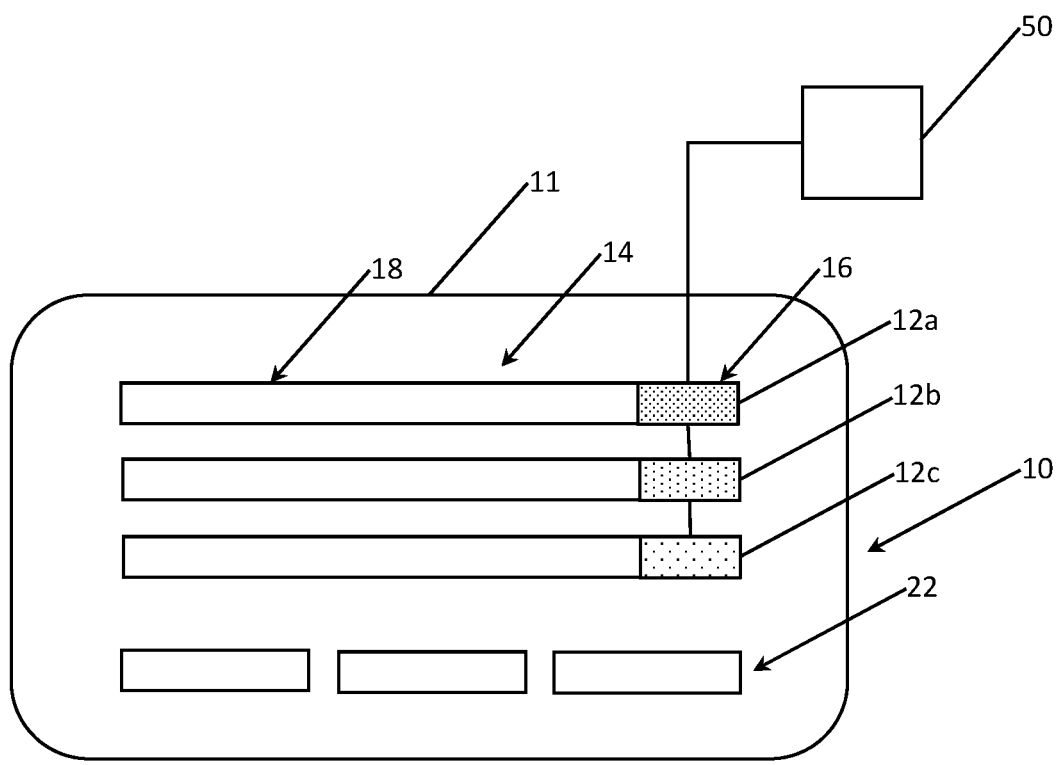
FIG. 3 is a schematic diagram illustrating another exemplary embodiment of the TID of the present disclosure utilizing a heater/radiation source, multiple time scales, and chemical sensors for spot tests in both pre-tamper and post-tamper actuation states.
Figure 3:
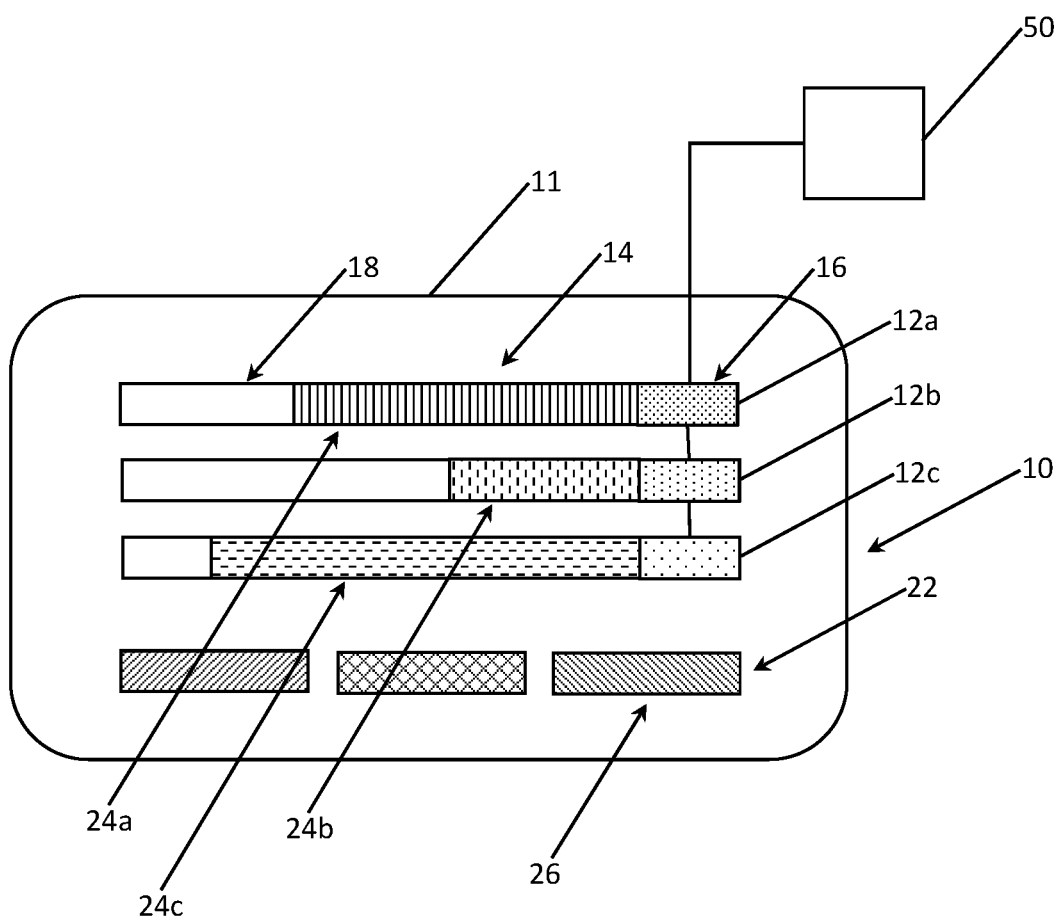

FIG. 3 illustrates another exemplary embodiment of the TID 10 of the present disclosure. The TID 10 again includes a substrate 11 on which the one or more tamper-indicating chronometers (TICs) 12a, 12b, 12c are disposed, each including a polymer or other elongate structure, fiber, or conduit 14 through which the penetrant will selectively diffuse. Elongate does not necessarily imply linearity, as spiral configurations and the like may also be used, for example. The penetrant chambers 16 are each directly coupled to diffusion portion 18 of the corresponding fiber 14. Alternatively, the penetrant chambers 16 can be disposed remotely from the associated fibers 14, but coupled to them via appropriate conduits. Here, the penetrant is selectively released in the associated fiber 14 by being heated, thinned, or evaporated by a coupled heater/radiation source 50 (i.e., a release mechanism) that is actuated by the tamper event. Thus, no physical barrier 20 (FIG. 1) is necessarily utilized. The penetrant could be a low-melt or low-evaporation solid, metal, polymer, or gel, for example, and the heater/radiation source 50 could be a resistance heater, a capacitance heater, an infrared (IR) heater, or a chemical reaction heat source, for example. As alluded to above, each of the TICs 12a, 12b, 12c may include a printed or otherwise available time scale, and these time scales may vary for each TIC 12a, 12b, 12c. For example, one TIC 12a may include a relatively slow diffusion path 24a that indicates weeks, months, or years since a tamper event, while another TIC 12b may include a relatively faster diffusion path 24b that indicates hours or days since the tamper event, while another TIC 12c may include a relatively faster diffusion path 24c that indicates minutes since the tamper event. In this manner, the exact time of the tamper event may be pinpointed. Again, the TICs 12a, 12b, 12c may utilize a visible degree of penetrant diffusion based on color or the like, or they may use a dye or the like that is only visible under an activating energy, allowing for both overt and covert devices. Again, examples of the first type of penetrant are small-molecule organic dyes, such as those from the triphenylmethane, azo, anthraquinone, perylene, and indigoid categories, among others; and examples of the second type of penetrant are chromic colorants, which change color in response to various external stimuli (e.g., light, heat, electricity, pressure, contact with liquids, and electrons for photochromic, thermochromic, electrochromic, piezochromic, solvatechromic, and carsolchromic materials, respectively). The polymer may initially be clear or of a first color or state and of a different color or state after diffusion of the penetrant. The polymer may also be doped with a chemical that selectively reacts with the penetrant to achieve the desired effect and functionality.

Current passive TIDs do not provide a timestamp of tampering. Thus, if a seal is discovered to be breached, an unauthorized access could have occurred at any point between application and inspection. Thus, the TID of the present disclosure incorporates one or more chemical timers to indicate the time since application or disturbance. The chemical timers rely on the diffusion of penetrants, or small molecules, along lengths of fibers, such as polymer or gel fibers, and, depending upon whether the penetrant has a color in its ground state or must be stimulated to exhibit one, could be configured for overt or covert reporting.

Thus, again, in various exemplary embodiments, the present disclosure provides a passive TID that a uses a chemical chronometer to indicate the length of time since application or since attempted or successful intrusion. The chemical timer is based on the diffusion of a penetrant, or small molecules, along a fiber, such as a polymer or gel fiber. If the mass transport properties are well known, the diffusion length or degree provides enough information to calculate the diffusion time. The TID is designed so that the penetrant and the fiber are separated until the device is purposely or inadvertently triggered, preferably by a barrier that fails under torsion, heat, contact with a liquid, etc. This activation mechanism is similar to that used in diphenyl oxalate glow sticks. If the penetrant has a color in its ground state, the timer is overt; if the penetrant is colorless until excited, the timer is covert. Examples of the first type of penetrant are small-molecule organic dyes, such as those from the triphenylmethane, azo, anthraquinone, perylene, and indigoid categories, among others; and examples of the second type of penetrant are chromic colorants, which change color in response to various external stimuli (e.g., light, heat, electricity, pressure, contact with liquids, and electrons for photochromic, thermochromic, electrochromic, piezochromic, solvatechromic, and carsolchromic materials, respectively.

Again, as used herein, diffusion and wicking have different underlying mechanisms. Diffusion refers to net migration from a region of higher concentration to a region of lower concentration, the rate depending upon the magnitude of the concentration gradient, the temperature, and the size and mass of the diffusing species, amongst other factors. Diffusion may occur over vastly different scales—for example, as with the penetration of atoms of one metal into the lattice of another, or the expansion of a gas into a room. Wicking refers to flow of a liquid into small pores in a solid material (i.e., the "wick"), and is driven by capillary action, which in turn depends on the relative strength of the adhesive forces between the liquid and the pore walls and the cohesive forces between the liquid molecules. The liquid is propelled into the pores when the liquid-wall adhesive forces are greater than the cohesive forces.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A tamper-indicating device, the tamper-indicating device comprising:
   a substrate;
   an elongate structure comprising a fiber having a diffusion portion disposed on the substrate, wherein the fiber comprises one or more of a polymer fiber and a gel fiber disposed on the substrate and in a rubbery state having a glass transition temperature below an anticipated operating temperature of the tamper-indicating device;
   a penetrant chamber disposed on the substrate adjacent to and at an end of the elongate structure; and
   a release mechanism disposed on the substrate adjacent to and at the end of the elongate structure between the elongate structure and the penetrant chamber and separating the elongate structure from the penetrant chamber on the substrate;
   wherein the penetrant chamber is adapted to contain a penetrant material that selectively diffuses into and along a length of the diffusion portion of the fiber from the end of the elongate structure at a predetermined rate when the release mechanism is actuated by a tamper event; and
   wherein the penetrant material creates an overt or covert indication of the degree of diffusion into the fiber, the degree of diffusion indicating an amount of time since the tamper event.

2. The tamper-indicating device of claim 1, further comprising a visible time scale disposed on the substrate adjacent to the elongate structure.

3. The tamper-indicating device of claim 1, wherein the one or more of the polymer fiber and the gel fiber is doped with a chemical that reacts with the penetrant material to create the overt or covert indication of the degree of diffusion into the elongate structure.

4. The tamper-indicating device of claim 1, wherein the release mechanism comprises a physical barrier disposed between the elongate structure and the penetrant chamber that is adapted to be ruptured by the tamper event.

5. The tamper-indicating device of claim 1, further comprising:
   an additional elongate structure comprising an additional fiber having an additional diffusion portion disposed on the substrate substantially adjacent to the elongate structure, wherein the additional fiber comprises one or more of an additional polymer fiber and an additional gel fiber disposed on the substrate and in a rubbery state having a glass transition temperature below an anticipated operating temperature of the tamper-indicating device;
   an additional penetrant chamber disposed on the substrate adjacent to and at an end of the additional elongate structure; and
   an additional release mechanism disposed on the substrate adjacent to and at the end of the additional elongate structure between the additional elongate structure and the additional penetrant chamber and separating the additional elongate structure from the additional penetrant chamber on the substrate;
   wherein the additional penetrant chamber is adapted to contain an additional penetrant material that selectively diffuses into and along a length of the additional diffusion portion of the additional fiber from the end of the additional elongate structure at a predetermined rate when the additional release mechanism is actuated by the tamper event; and
   wherein the additional penetrant material creates an additional overt or covert indication of the degree of diffusion into the additional fiber, the degree of diffusion also indicating an amount of time since the tamper event.

6. The tamper-indicating device of claim 1, further comprising one or more chemical sensors disposed substantially adjacent to the elongate structure and adapted to indicate the presence or absence of an environmental contaminant or a tampering agent.

* * * * *